United States Patent [19]

Møller et al.

[11] Patent Number: 5,686,124
[45] Date of Patent: Nov. 11, 1997

[54] METHOD FOR RESTRUCTURATION OF RAW MEAT FOR PRODUCTION OF RESTRUCTURED RAW MEAT BY ADDITION TO THE MEAT OF TRANSGLUTAMINASE

[75] Inventors: Anders Juel Møller, Hørsholm; Ghita Studsgaard Nielsen, Farum; Bent Riber Petersen, Copenhagen, all of Denmark

[73] Assignee: Novo Nordisk A/S, Bagsvaerd, Denmark

[21] Appl. No.: 602,785

[22] PCT Filed: Sep. 13, 1994

[86] PCT No.: PCT/DK94/00339

§ 371 Date: Mar. 8, 1996

§ 102(e) Date: Mar. 8, 1996

[87] PCT Pub. No.: WO95/08274

PCT Pub. Date: Mar. 30, 1995

[30] Foreign Application Priority Data

Sep. 20, 1993 [DK] Denmark .................. 1047/93

[51] Int. Cl.$^6$ .................. A23L 1/317; A23J 3/04
[52] U.S. Cl. .................. 426/56; 426/74; 426/442; 426/574; 426/652
[58] Field of Search .................. 426/7, 55, 56, 426/59, 74, 574, 652, 442, 573

[56] References Cited

U.S. PATENT DOCUMENTS

| | | | |
|---|---|---|---|
| 4,917,904 | 4/1990 | Wakameda et al. | 426/7 |
| 5,082,672 | 1/1992 | Hamada et al. | 426/7 |
| 5,098,733 | 3/1992 | Kyogoku et al. | 426/574 |
| 5,156,956 | 10/1992 | Motoki et al. | 426/573 |
| 5,518,742 | 5/1996 | Soeda et al. | 426/59 |

FOREIGN PATENT DOCUMENTS 0 201 975   11/1986   European Pat. Off. .

OTHER PUBLICATIONS

Wijngaards, G., et al., Trends in Modern Meat Technology 2, pp. 125–129.
Chemical Abstract, Abstract No. 57791q, JP 02086748.
Chemical Abstract, Abstract No. 57797w, JP 02100651.
Chemical Abstract, Abstract No. 141839q, JP 02255060.
Chemical Abstract, Abstract No. 130930, JP 02135071.
Chemical Abstract, Abstract No. 156968.
Chemical Abstract, Abstract No. JP 2079956.
Klettner, P.-G., Fleischwirtsch. vol. 69, No. 2, pp. 225–226 (1989).

Primary Examiner—Thomas S. Wyse
Attorney, Agent, or Firm—Steve T. Zelson, Esq.; Elias J. Lambiris, Esq.

[57] ABSTRACT

The method for restructuration of raw meat for production of restructured raw meat by addition to the meat of transglutaminase comprises the further addition of phosphate (optional) and sodium chloride, with a subsequent temperature treatment. Hereby the cohesion and hardness of the restructured raw meat is improved, and it can be sold as a refrigerated meat product.

8 Claims, No Drawings

METHOD FOR RESTRUCTURATION OF RAW MEAT FOR PRODUCTION OF RESTRUCTURED RAW MEAT BY ADDITION TO THE MEAT OF TRANSGLUTAMINASE

CROSS-REFERENCE TO RELATED APPLICATIONS

This application is a continuation of PCT/DK94/00339 filed Sep. 13, 1994, which is incorporated herein by reference.

The invention comprises a method for restructuration of raw meat for production of restructured raw meat by addition to the meat of transglutaminase.

Methods of this kind are described in the literature. Reference can be made to Trends in modern meat technology 2, Pudoc Wageningen 1988, pages 125–129, from which it appears that meat pieces can be converted to a coherent meat mass by addition of i.a. transglutaminase. Reference also can be made to Japanese patent application No. JP 2079956 (WPI Acc. no. 90-129641 in Dialog), from which it appears that moulded meat can be prepared by moulding waste pieces of meat with transglutaminase.

The critical factor in relation to the methods of the above indicated kind is the texture parameters of the restructured raw meat, as measured by texture profile analyses, especially the cohesion and the hardness. These texture parameters, especially the cohesion and the hardness are unsatisfactory and thus open to improvement.

EP 0201975 describes a method of the same kind as the method according to the invention. However, a must in relation to this prior art method is the use of a binding material of external fibrin, which again necessitates the use of fibrinogen and the expensive thrombin.

Thus, the purpose of the invention is the provision of a cheap method for restructuration of raw meat for production of restructured raw meat, in relation to which the texture parameters of the restructured raw meat, especially the cohesion and the hardness, are improved considerably in comparison to the prior art methods.

The method according to the invention for restructuration of raw meat for production of restructured raw meat by addition to the meat of transglutaminase is characterized by the fact that no external binding protein is added to the meat, and that besides transglutaminase also up to 0.4% by weight of a phosphate of an alkali metal and between 1.5 and 4% by weight of sodium chloride, related to the weight of the meat, is added to the meat and mixed into the meat, whereafter the thus generated meat mixture is exposed to a temperature between 5° C. and 37° C. in a time interval between 90 minutes and 48 hours. If the transglutaminase requires calcium for activity, calcium should be added in a satisfactory concentration, as in prior art methods of this kind. Use of the transglutaminase factor XIIIa is specially preferred in the invention. For best results the large time intervals should be used in relation to the low temperatures, and vice versa.

Surprisingly it has been found that the texture parameters of the restructured raw meat prepared by means of the method according to the invention, especially the cohesion and the hardness, exhibits a significant improvement in comparison to the cohesion and the hardness of the meat prepared by prior art methods.

It has been found that the meat prepared by means of the method according to the invention can be sold as a refrigerated meat product, because the refrigerated meat product exhibits a superior cohesion and hardness, as compared to prior art restructured raw meat.

Transglutaminase is added to the meat in the usual amounts, i.e. between 0.01 and 1% of pure transglutaminase protein, calculated in relation to the substrate, i.e. the meat protein.

By phosphates in this invention we understand ortophosphates, pyrophosphates and polyphosphates, especially tripolyphosphates, of alkali metals, especially sodium or potassium. Phosphates of alkaline earth metals, e.g. calcium phosphates, are not suited for the invention.

It has been found that addition of the phosphate of an alkali metal s above 0.4% does not improve the cohesion and the hardness of the meat. Also, it has been found that addition of sodium chloride below 1.5% does not improve the cohesion and hardness of the meat; furthermore, an addition of sodium chloride above 4% by weight would not be relevant for raw meat products.

A preferred embodiment of the method according to the invention is characterized by the fact that the phosphate of an alkali metal is added in an amount of between 0.15 and 0.25% by weight. In this manner excellent improvements of the cohesion and hardness are obtained.

A preferred embodiment of the method according to the invention is characterized by the fact that the sodium chloride is added in an amount of between 2 and 3% by weight. In this manner excellent improvements of the cohesion and hardness are obtained.

A preferred embodiment of the method according to the invention, is characterized by the fact that the phosphate (if added), the transglutaminase, and the sodium chloride is added as an aqueous solution. This solution should preferably be as concentrated as possible. In this manner the subsequent mixing process is carried out without any difficulty.

From U.S. Pat. No. 4,917,904 it appears that the properties of meat can be modified by addition of transglutaminase, salt and a phosphate. This prior art, however, does not describe the use of an alkali metal phosphate, and furthermore, this prior art method is not a method for production of restructured raw meat, but a method for production of high temperature treated, smoked meat. Thus, this prior art method differs significantly from the method according to the invention.

EXAMPLE 50 g of meat minced twice in a Braun mincing machine (for kitchen use) with holes 4.5 mm in diameter, 4.7 ml distilled water, in which the later specified additives (a g of sodium chloride and b g of sodium tripolyphosphate), except for transglutaminase, were dissolved, inclusive of 0.3 ml 1M calcium chloride corresponding to 5 mM, were mixed. An amount of F XIII a corresponding to 44 mg of pure F XIII a enzyme protein dissolved in 5 ml of distilled water and stirred for 30 minutes was added to the meat and mixed well with the meat. The meat mixture was filled into polyethylene casings with a flattened cross measure of 45 mm and a length of 250 mm. These samples are referred to as sausages in the following.

The sausages were then placed in a water bath heated to 37° C. for 90 minutes and then stored in a refrigerator at 5° C. until texture profile analyses were performed the following day. All experiments were carried out as two times replicates.

The texture profile analyses were carried out as follows.

An Instron machine, type 4301, was used to carry out the texture profile analyses. The load cell used was 1000N, and the test stamp was 35 mm. The compression was 75% and the speed was 100 mm/minute. The load range was 10%, corresponding to 100N, and the paper speed compared to the cylinder speed was 10:1. The measurement was carried out on samples that were 10 mm thick and 29 mm in diameter, and the compression was carried out twice on each piece. The temperature of the sample was 25° C. at the time of the analysis. Five samples of each sausage were analysed.

According to Klettner, P-G (1989), Fleischwirtschaft, 69(2), 225 the first stress applied caused a breakdown of texture, expressed in the first peak, and then a second peak produced by the whole squeezing process. The height of the first peak is defined as the breaking strength ($B_c$) and the second peak as the hardness ($F_c$). The c symbolizes the compression. After the first stress the test stamp lifted upwards before the second stress was applied. The ratio between surfaces under the second stress ($A_2$) and the first stress ($A_1$) is the cohesion ($C_c$). This ratio was determined by cutting out the surfaces and weighing them.

The values for a and b and the corresponding values for cohesion and hardness, measured as defined above, were as follows, vide Table 1.

TABLE 1

| Status | a | b | Cohesion | Hardness |
|---|---|---|---|---|
| Prior art | 0 | 0 | 0.36 | 37.48 |
| Invention | 1.2 | 0 | 0.36 | 53.22 |
| | 1.2 | 0.12 | 0.46 | 90.35 |
| | 1.8 | 0 | 0.41 | 73.64 |
| | 1.8 | 0.12 | 0.48 | 109.40 |

It appears from Table 1 that the values for cohesion and hardness in no case is inferior for the invention in comparison to prior art, and that the values for cohesion and hardness as an average is much better for the invention in comparison to prior art.

We claim:

1. A method for restricting raw meat, comprising
   (a) adding to the raw meat (i) a transglutaminase, (ii) sodium chloride in an amount in the range of 1.5–4% by weight, based on the the weight of the raw meat and (iii) an alkali metal phosphate in the range of 0.15–0.25% by weight, based on the weight of the raw meat;
   (b) mixing the transglutaminase, the sodium chloride and the phosphate with the raw meat to form a meat mixture; and
   (c) exposing the meat mixture to a temperature in the range of 5°–37° C. for a period of time in the range of 90 minutes to 48 hours;
wherein that no external binding protein is added to the meat.

2. The method according to claim 1, wherein the alkali metal phosphate is sodium tripolyphosphate.

3. The method according to claim 1, wherein the sodium chloride is added in an amount in the range of 2–3% by weight.

4. The method according to claim 2, wherein the sodium chloride is added in an amount in the range of 2–3% by weight.

5. The method according to claim 1, wherein the transglutaminase, the sodium chloride and the phosphate are added in the form of an aqueous solution.

6. The method according to claim 2, wherein the transglutaminase, the sodium chloride and the phosphate are added in the form of an aqueous solution.

7. The method according to claim 3, wherein the transglutaminase, the sodium chloride and the phosphate are added in the form of an aqueous solution.

8. The method according to claim 4, wherein the transglutaminase, the sodium chloride and the phosphate are added in the form of an aqueous solution.

* * * * *